Oct. 10, 1950     H. J. BIERMAN     2,525,581
APPARATUS FOR TREATING FOOD MATERIAL
Filed July 8, 1947
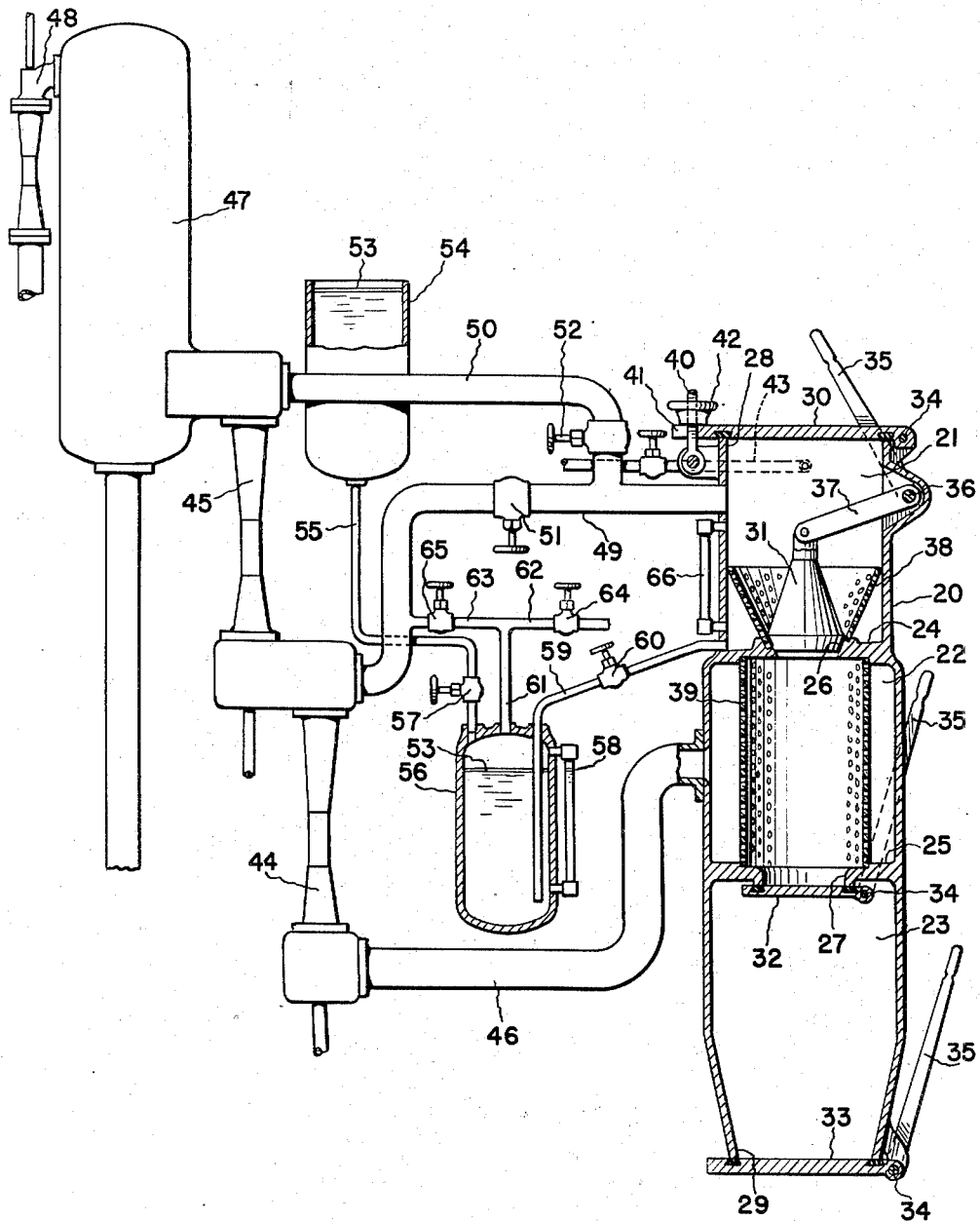
INVENTOR
HUBERT J. BIERMAN
BY
HIS ATTORNEY.

Patented Oct. 10, 1950

2,525,581

UNITED STATES PATENT OFFICE 2,525,581

APPARATUS FOR TREATING FOOD MATERIAL

Hubert J. Bierman, Chatham, N. J., assignor to Ingersoll-Rand Company, New York, N. Y., a corporation of New Jersey Application July 8, 1947, Serial No. 759,621

5 Claims. (Cl. 99—271)

This invention relates to a processing apparatus, and more particularly to an apparatus for treating food material.

One object of the invention is to effect the impregnation of a charge of food material with a liquid additament for preserving or changing the coloring of the food, for example, or to add a flavoring or enriching substance thereto.

A more specific object is to effect the pentration of the liquid additament into the food by subjecting the food and the liquid alternately to different degrees of vacuum.

Other objects will be in part obvious and in part pointed out hereinafter.

The drawing accompanying this specification is a diagrammatic view of an apparatus for treating food material and showing it applied to a food blanching and freezing device.

Referring more particularly to the drawing, 20 designates the casing of a food processing device of the type forming the subject matter of United States Patent No. 2,407,482 granted to F. B. Doyle, September 10, 1946. The interior of the casing 20 is accordingly divided into a blanching chamber 21 wherein the food is blanched, a freezing chamber 22 wherein the food is subjected to a high vacuum for effecting the quick freezing thereof, and a storage chamber 23 from which the frozen food is withdrawn for transportation or final storage.

The walls 24 and 25 dividing the chambers 21—22 and 22—23, respectively, have openings 26 and 27 for the discharge of food by gravity from one chamber to the other, and at the upper and lower ends, respectively, of the casing 20 are openings 28 and 29 through which the food is introduced into the blanching chamber 21 and discharged from the storage chamber 23.

Closures are provided for the openings 28, 26, 27 and 29, respectively, in the form of a plate 30, a valve 31, and plates 32 and 33. The plate closures are each pivotally connected to the casing by pins 34, and the plates 32—33 have levers 35 located exteriorly of the casing for shifting them. The valve 31 is also actuated by a lever 35 suitably connected to a pivot pin 36 seated in the casing 20 and attached to an end of an arm 37 the opposite end of which is pivotally connected to the upper end of the valve 31.

Owing to this arrangement, the valve 31 will be lifted upwardly into the blanching chamber 21 to permit the discharge of food from the blanching chamber through the opening 26 into the freezing chamber, and movement of the lever in the opposite direction will lower the valve into sealing engagement with the wall of the opening 26. The food material is guided to the discharge opening 26 by a perforated hopper 38 and is retained from contact with the wall of the freezing chamber by a perforated cylinder 39 interposed between the walls 24 and 25.

The plate 30 is held in the closed position by an eye-bolt 40 which is pivotally connected to the casing 20 and extends through a slot 41 in the plate. A nut 42 in the form of a hand-wheel is threaded onto the eye-bolt 40 and seats upon the plate for clamping it against the end of the casing 20.

The steam used for blanching the food material is introduced into the blanching chamber 21 by a valve-controlled conduit 43, and the means serving to create the vacuum in the processing chambers comprises, in the present instance, first and second stage ejectors 44 and 45 which are arranged in tandem. The suction chamber of the ejector 44 is in communication with the freezing chamber 22 through a conduit 46 and the ejector 45 discharges into a barometric condenser 47 from the upper end of which the uncondensible gases are withdrawn by a third stage ejector 48.

The ejectors 44 and 45 also serve to evacuate the blanching chamber 21 through a conduit 49 leading from the blanching chamber to the end of the ejector 45 and through a conduit 50 branching from the conduit 49 and leading to the discharge end of said ejector. The conduits 49 and 50 are provided with valves 51 and 52, respectively, for selectively communicating one end or the other of the ejector 45 with the blanching chamber.

The supply of liquid 53 intended for addition to the food material is contained in a vessel 54 which has a discharge conduit 55 leading from its lower end to the upper end of a container 56 to enable the liquid to flow to the latter by gravity. The conduit 55 is controlled by a valve 57, and on the side of the container 56 is a sight-glass 58 for indicating the height of the liquid in the container. Such liquid passes to and from the blanching chamber 21 through a conduit 59 controlled by a valve 60 and opening into the lower end of the blanching chamber. The conduit 59 is preferably inclined to enable any liquid in excess of that required for treating the food material to drain back into the container 56 and extends downwardly into the container to a point near its lower end so that it will be sealed by the liquid.

In order that liquid in the container 56 may be selectively subjected to different pressures for expelling it from the container and to facilitate its return from the blanching chamber said container is provided with a conduit 61 that opens into the upper end thereof and has branches 62 and 63 leading, respectively, to the atmosphere and to the conduit 49 at a point between the valve 51 and the ejector 45. The branches 62 and 63 are controlled by valves 64 and 65, respectively.

Preferably, a sight-glass 66 is disposed at the side of the casing 20 to communicate at its ends with the blanching chamber 21 for indicating the elevation of the liquid in said chamber.

In the operation of the device, and assuming the closures of the casing 20 and the various valves to be in their closed positions and the blanching chamber 21 charged with food material, steam for blanching is then admitted into the chamber 21 through the conduit 43 for blanching the food, and when the steam has again been cut-off the valve 52 is opened to communicate the blanching chamber with the discharge end of the ejector 45 for pre-cooling the food.

After the blanching chamber 21 has been thus evacuated the valve 64 is opened to communicate the upper end of the container with the atmosphere. The valve 60 is then also opened and the pressure within the container 56, acting upon the surface of the liquid, will force the liquid through the conduit 59 into the blanching chamber 21, and when the level of the liquid, as indicated by the sight-glass 66, rises above the food material the valve 60 is again closed. At the same time, communication between the blanching chamber and the ejector 45 is cut-off by closing the valve 52. The valve 51 is next opened and maintained thus for a brief period of time, say five seconds or thereabouts, to communicate the blanching chamber with the inlet end of the ejector 45 and thereby subject the contents in the blanching chamber to a higher degree of vacuum. Upon closure of the valve 51 the valve 52 is opened for a similar period to again subject the food and the liquid to a lower degree of vacuum.

By thus operating the valves 51—52 in alternate order pressure impulses will be created in the chamber 21 to cause the liquid to permeate the food material, and such operation of the valves 51—52 may be repeated as often as required to effect a desired degree of penetration of the liquid into the food material.

Upon completion of the impregnating period and assuming the valves 64 and 51 to be closed, the valves 52, 60 and 65 are again opened. The blanching chamber 21 will thereby be communicated with the condenser 47 and the upper portion of the container will be communicated with the intake end of the ejector 45. In consequence, the vacuum in the container will be higher than in the blanching chamber and the liquid will then return to the container for re-use with a succeeding batch of food material. In the event that the liquid thus returned to the container is deemed to be of an insufficient quantity for treatment of another charge of food, make-up liquid is valved into the container from the vessel 54 and, at the same time, the valve 64 is opened to communicate the container with the atmosphere in order to assure a free flow of liquid into the container.

I claim:

1. In an apparatus for treating food material, a casing having a chamber to receive a charge of food material, a container for a liquid additament for the food material, a conduit for conveying such liquid from the container to the chamber, multi-stage evacuators for the chamber, and means for alternately communicating the evacuators with the chamber to alternately create different degrees of vacuum in the chamber for causing the liquid to penetrate the food material.

2. In an apparatus for treating food material, a casing having a chamber to receive a charge of food material, a container for a liquid additament for the food material, a conduit for conveying such liquid from the container to the chamber, multi-stage evacuators for the chamber, and means for alternately communicating the chamber with successive stage evacuators to create impulses within the chamber for effecting penetration of the liquid into the food material.

3. In an apparatus for treating food material, a casing having a chamber to receive a charge of food material, a container for a liquid additament for the charge of food material, a conduit for conveying such liquid from the container to the chamber, multi-stage evacuators for the chamber, conduits to afford communication between the evacuators and the chamber, and valves for the conduits to alternately communicate the evacuators with the chamber and thereby create pressure impulses in said chamber for effecting the penetration of liquid into the food material.

4. In an apparatus for treating food material, a casing having a chamber to receive a charge of food material, a container for a liquid additament for the food material, a conduit for conveying such liquid to and from the chamber, a valve for controlling the conduit, means for selectively subjecting the chamber and the interior of the container to pressures of different values for transferring liquid from the container to the chamber and from the chamber to the container, and means for subjecting the contents in the chamber successively to different degrees of vacuum for effecting the penetration of the liquid into the food.

5. In an apparatus for treating food material, a casing having a chamber to receive a charge of food material, a container for a liquid additament for the food material, a conduit for conveying such liquid from the container to the chamber and from the chamber to the container, multi-stage evacuators for the chamber, and means for selectively communicating the container with the atmosphere and the chamber with one evacuator to cause the transfer of liquid from the container to the chamber and to communicate the container with one evacuator and the chamber with another evacuator to cause the transfer of liquid from the chamber to the container.

HUBERT J. BIERMAN.

REFERENCES CITED

The following references are of record in the file of this patent:

UNITED STATES PATENTS

| Number | Name | Date |
|---|---|---|
| 616,199 | McCallum | Dec. 20, 1898 |
| 832,764 | Wood et al. | Oct. 9, 1906 |
| 1,289,302 | Thoen | Dec. 31, 1918 |
| 2,407,482 | Doyle | Sept. 10, 1946 |